(12) United States Patent
Willetts

(10) Patent No.: US 7,245,046 B2
(45) Date of Patent: Jul. 17, 2007

(54) INTERNAL POWER RE-ROUTING BY REVERSE POWERING TO OVERCOME FAULT SCENARIOS IN SUBMARINE CABLE SYSTEMS

(75) Inventor: Derek C. Willetts, Wilmington (GB)

(73) Assignee: Alcatel, Paris (FR)

( * ) Notice: Subject to any disclaimer, the term of this patent is extended or adjusted under 35 U.S.C. 154(b) by 565 days.

(21) Appl. No.: 10/737,902

(22) Filed: Dec. 18, 2003

(65) Prior Publication Data

US 2004/0160127 A1 Aug. 19, 2004

(30) Foreign Application Priority Data

Dec. 21, 2002 (GB) .................................. 0229980.8

(51) Int. Cl.
*H01B 7/30* (2006.01)
(52) U.S. Cl. ........................ 307/147; 340/852; 398/105
(58) Field of Classification Search ................ 307/131, 307/147, 126; 340/850, 852; 398/104, 105; 327/544
See application file for complete search history.

(56) References Cited

U.S. PATENT DOCUMENTS

| | | | | |
|---|---|---|---|---|
| 5,517,383 A | * | 5/1996 | Webb | 361/191 |
| 5,532,478 A | * | 7/1996 | Kogure | 250/227.24 |
| 5,655,036 A | * | 8/1997 | Webb | 385/15 |
| 5,841,205 A | * | 11/1998 | Webb | 307/130 |
| 6,166,836 A | * | 12/2000 | Crameri et al. | 398/18 |
| 6,895,187 B1 | * | 5/2005 | Webb | 398/104 |
| 7,067,940 B2 | * | 6/2006 | Bianchi | 307/131 |
| 2002/0122282 A1 | * | 9/2002 | Pirovano | 361/191 |

FOREIGN PATENT DOCUMENTS

| | | |
|---|---|---|
| EP | 1 096 702 A2 | 5/2001 |
| GB | 2 275 834 A | 9/1994 |

\* cited by examiner

*Primary Examiner*—Chau N. Nguyen
*Assistant Examiner*—Daniel Cavallari
(74) *Attorney, Agent, or Firm*—Sughrue Mion, PLLC

(57) ABSTRACT

System and method for re-routing internal power for reducing voltage requirements of a submarine transmission system. A power supply supplies power to a bridge rectifier circuit (10) the latter biasing a plurality of Zener diodes (11; 12; 13; 14; 15; 16) which are connected in parallel arrangement with respective optical amplifiers (21; 22; 23; 24; 25; 26). The bridge rectifier circuit (10) is arranged such that a first predetermined number of Zener diodes (23; 24; 25; 26) are biased in forward bias direction thus operating as normal diodes with a low voltage drop, whereas a second predetermined number of Zener diodes (21; 22) are biased in reverse or powering direction thus powering respective optical amplifiers.

7 Claims, 3 Drawing Sheets

INTERNAL POWER RE-ROUTING BY REVERSE POWERING TO OVERCOME FAULT SCENARIOS IN SUBMARINE CABLE SYSTEMS

The present invention relates to submarine cable systems in submarine telecommunications. More particularly the invention relates to the use of internal power re-routing by reverse powering to overcome fault scenarios in submarine cable systems.

BACKGROUND OF THE INVENTION

As is widely known, submarine telecommunication systems use cable in order to supply power to the equipment used along a transmission line where the transmission is usually performed on optical fibers. A fairly substantial longitude of these cables is laid down in deep sea. Repeaters or regenerators are used to receive line currents and in turn supply voltage to be fed to optical fibers carrying telecommunication traffic signals. The submarine cables can be damaged by external causes giving rise to power fault in the system as a whole or in a part thereof. The power fault causes in turn loss of traffic on the optical fibers associated to the faulty power feed. When the damage is located in deep sea, the task of repair become substantially difficult and costly. Nevertheless it is usually desired that the traffic is restored as soon as possible.

In normal operation, the supply voltage of a long submarine system can be up to 18 kV. The voltage is supplied by two power supply units, one at each end of the system.

The individual voltage rating of these power supplies is often not adequate to supply the full system voltage on their own, therefore the system powering is shared between the various power supply units, at least between two of them. Typical power supplies may only be capable of supplying 12 kV of the 18 kV maximum required. Therefore, in the event of a power supply failure or a cable shunt fault currently the system will not be able to carry traffic because of the shortage of supply current due to the reduced power supply voltage capability.

FIG. 1 shows the voltage requirements of a typical submarine system in terms of system voltage as a function of system length and number of fiber pairs. In this figure various graphs 1, 2, 3, 4, 5 and 6 are shown, each of these graphs correspond to the voltage requirements when the number of fiber pairs use is 1, 2, 3, 4, 5 and 6 respectively. As can be seen in this figure, on long systems, for example with a length of 8000 km, with many fiber pairs, for example six, the voltage requirements can be as high as about 18 kV. On the other hand it can also be observed in the figure that as the number of fiber pairs is reduced, the voltage requirements for the system are reduced as well. For example, it is readily appreciated that by using two fiber pairs, the voltage requirements of the system can be reduced to about 12 kV for the same distance of 8000 km.

Also as already mentioned above, if a fault occurs such as a power supply failure or a shunt fault in the cable, then a single 12 kV power supply is not capable of powering the complete system giving rise to the loss of the traffic in the whole system.

It is therefore desired to provide an efficient solution for a fast and efficient restoring of the traffic when such power faults occur.

DESCRIPTION OF THE INVENTION

The above objective is reached by using the solution proposed by the present invention according to which partial traffic on some fiber pairs can be re-stored in a fault condition.

The present invention proposes the use of a combination of Bridge rectification and forward biasing of Zener diodes usually used in reverse bias mode to reduce the system voltage requirements.

Accordingly it is an object of the present invention to provide a system for re-routing power for reducing a voltage requirement in a submarine transmission system, the system comprising at least one power supply for supplying current to a bridge rectifier circuit the latter being adapted to bias a plurality of Zener diodes, each Zener diode being connected in parallel arrangement with a respective optical amplifier, characterized in that said bridge rectifier circuit is adapted for biasing a first predetermined number of Zener diodes in forward bias direction.

According to an aspect of the invention, the bridge rectifier circuit is adapted for biasing a second predetermined number of Zener diodes in reverse or powering direction.

According to another aspect of the invention, the second predetermined number of Zener diodes comprises two Zener diodes.

Another object of the present invention is that of providing a method for re-routing power for reducing a voltage requirement in a submarine transmission system, the system comprising at least one power supply for supplying current to a bridge rectifier circuit the latter biasing a plurality of Zener diodes, each Zener diode being connected in parallel arrangement with a respective optical amplifier, characterized in that said bridge rectifier circuit biases a first predetermined number of Zener diodes in forward bias direction.

These and further advantages of the present invention are explained in more detail in the following description as well as in the claims with the aid of the accompanying drawings.

EXAMPLES OF PREFERRED EMBODIMENTS

Figure 1:
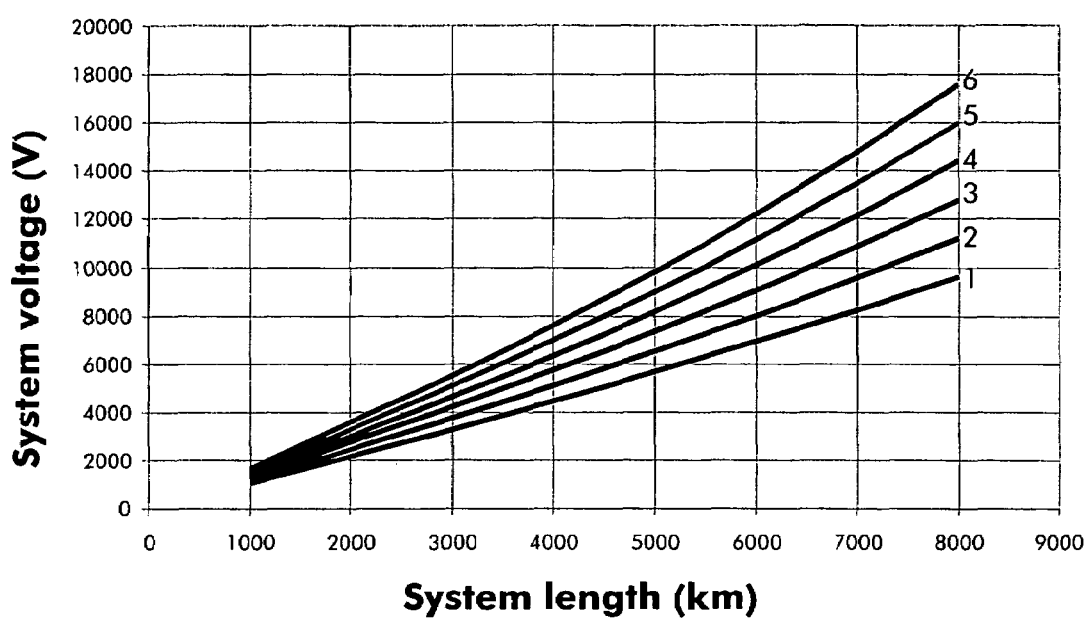
FIG. 1 is a graphical representation of the voltage requirements of a conventional submarine system showing the system voltage as a function of system length.

According to the graphs representation FIG. 1 and as already discussed above, if the number of fiber pairs can be reduced, then the power supply voltage requirements will also drop. For example if at 8000 km the six fiber pair system can be reduced to a two fiber pair system then the power supply requirement can be reduced to below 12 kV as represented by graph 2 allowing single end power feeding as the voltage capacity of a conventional power supply is about this level.

Figure 2:
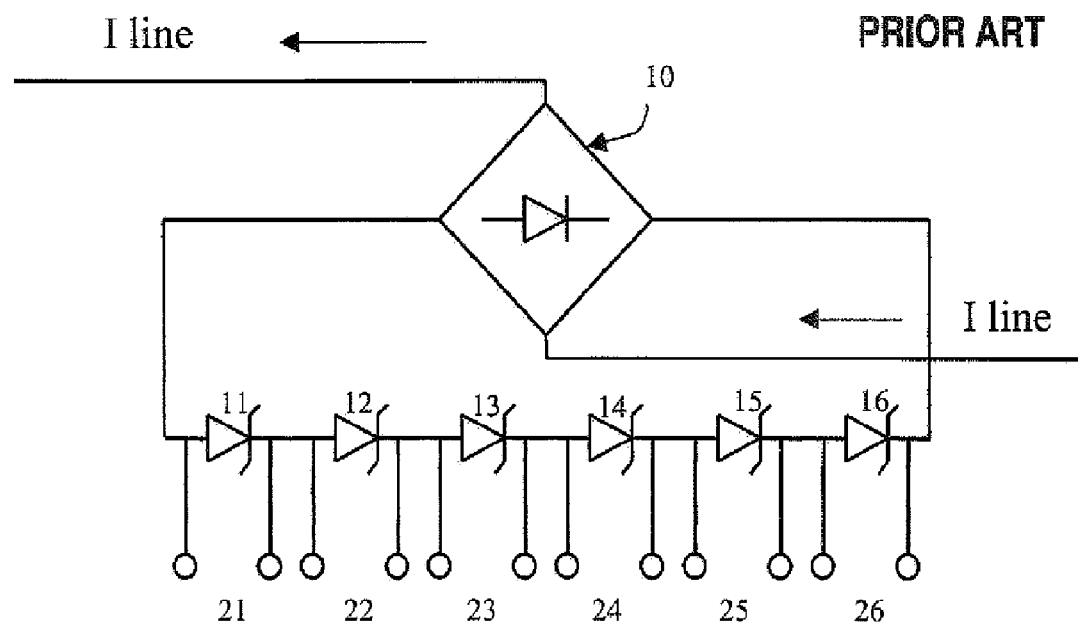
FIG. 2 is a schematic representation of a conventional repeater for supplying power to a plurality of optical fibers.

Referring to FIG. 2, a conventional repeater for supplying power to six fiber pairs is shown, In this figure the line current is represented by I Line with an arrow showing the normal direction of current flow in operating conditions. A rectifier bridge 10 is connected to the line current, I Line, at the input and output thereof and connected to 6 Zener diodes 11, 12, 13, 14, 15, 16 at the bridge ports thereof the Zener diodes being connected in series arrangement. Each of the Zener diodes 11, 12, 13, 14, 15, 16 is connected in parallel arrangement to a respective optical amplifier pair 21, 22, 23, 24, 25, 26 which usually comprise a pair of optical fibers. The power supply for each amplifier pair is derived from the respective Zener diode connected thereto as it can be seen in FIG. 2.

With this arrangement, when the line current, I Line, is reversed, there is no effect in the polarity of the Zener diodes 11, 12, 13, 14, 15, 16 as the bridge rectifier ensures that the Zener diodes are always biased in the normal—power supply—direction. In this configuration the repeater is said to be fully reversible.

Figure 3:
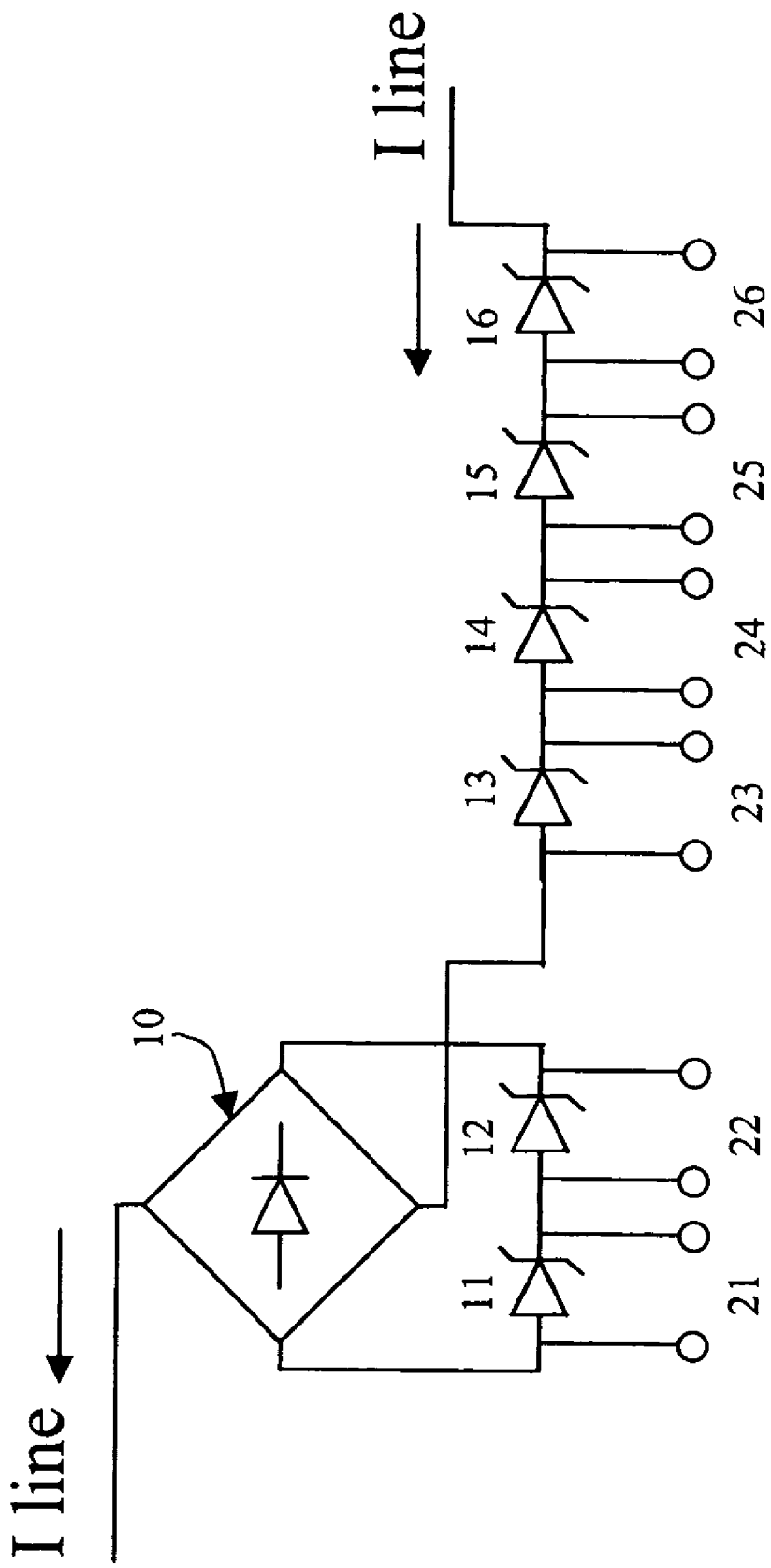
FIG. 3 is a schematic representation of a modified repeater in accordance to the solution provided by the present invention.

Referring now to FIG. 3, a modified circuit is shown as proposed by the present invention. In this figure, like element have like reference numerals for ease of understanding.

In the arrangement of FIG. 3, the known six fiber pair configuration of FIG. 2 has been converted into a new two fiber pair configuration by simply reversing the line current.

As can be seen in FIG. 3, when the line current, I Line, is flowing from right to left of the figure, i.e. in the direction of the arrow, all the Zener diodes 11, 12, 13, 14, 15, 16 are biased normally, hence all amplifier pairs are powered. By reversing the flow of this current to flow from left to right of the figure, i.e. in opposite direction with respect to the arrow, only Zener diodes 11 and 12, associated with amplifier pairs 21 and 22 are normally biased as they are inside the bridge rectifier 10. All of the remaining Zener diodes 13, 14, 15, 16 will be forward conducting, hence acting as normal diodes with a low voltage drop.

In this manner, the number of optical fiber pairs active in the system has been reduced to two pairs 11 and 12, which according to the graphs shown in FIG. 1 would have reduced voltage requirements in comparison to the six fiber pair arrangements. Therefore the two fiber pairs 11 and 12 can be powered with only one power supply and thus the traffic can be restored on the two active optical fiber pairs 11 and 12. It is to be noted that the solution proposed by the present invention requires that the power supply polarity be reversed.

The actual position of the bridge 10 in terms of how many amplifier pairs are inside or outside depends upon system powering details and requirements. It is to be understood that the bridge can be arranged to encompass any number of fiber pairs according to the conditions and requirement of the system, up to the total number within the repeaters.

The invention claimed is:

1. A system for re-routing power for reducing a voltage requirement in a submarine transmission system, the system comprising:
    a bridge rectifier circuit (10);
    at least one power supply for supplying current to the bridge rectifier circuit (10); and
    a plurality of Zener diodes (11; 12; 13; 14; 15; 16), each Zener diode connected in a parallel arrangement with a respective optical amplifier (21; 22; 23; 24; 25; 26),
    wherein the bridge rectifier circuit (10) is operative to bias a first predetermined number of Zener diodes (23; 24; 25; 26) in a forward bias direction.

2. A system according to claim 1, wherein the bridge rectifier circuit (10) is operative to bias a second predetermined number of Zener diodes (21; 22) in reverse bias direction.

3. The system according to claim 2, wherein the second predetermined number of Zener diodes comprises two Zener diodes.

4. A method for re-routing power for reducing a voltage requirement in a submarine transmission system, the system comprising at least one power supply for supplying current to a bridge rectifier circuit (10), the bridge rectifier circuit operative to bias a plurality of Zener diodes (11; 12; 13; 14; 15; 16), each Zener diode being connected in parallel arrangement with a respective optical amplifier (21; 22; 23; 24; 25; 26), the method comprising;
    the bridge rectifier circuit (10) biasing a first predetermined number of Zener diodes (23; 24; 25; 26) in a forward bias direction.

5. The system according to claim 1, wherein the first predetermined number and the second predetermined number are not equal.

6. The method according to claim 4, wherein the bridge rectifier circuit (10) is operative to bias a second predetermined number of Zener diodes (21; 22) in a reverse bias direction.

7. The method according to claim 6, wherein the first predetermined number and the second predetermined number are not equal.

* * * * *